United States Patent
Chai

[19]

[11] Patent Number: 5,978,976
[45] Date of Patent: Nov. 9, 1999

[54] POTTY FOR TOILET TRAINING

[75] Inventor: Inkee Chai, Seoul, Rep. of Korea

[73] Assignee: Penta Zone Inc., Seoul, Rep. of Korea

[21] Appl. No.: 09/181,606

[22] Filed: Oct. 28, 1998

[30] Foreign Application Priority Data

Nov. 6, 1997 [KR] Rep. of Korea ...................... 97-58553

[51] Int. Cl.⁶ ................................................. A47K 11/00
[52] U.S. Cl. ................................................. 4/483; 4/902
[58] Field of Search .............................. 4/449, 479, 483, 4/902, DIG. 5, 661

[56] References Cited

U.S. PATENT DOCUMENTS

| | | | |
|---|---|---|---|
| 2,100,950 | 11/1937 | Giblette | 4/483 |
| 2,612,210 | 9/1952 | Light | 4/483 |
| 5,008,964 | 4/1991 | Dean et al. | |
| 5,161,263 | 11/1992 | Geneve et al. | 4/483 |
| 5,369,820 | 12/1994 | Blount | 4/902 |
| 5,535,456 | 7/1996 | Chai | |
| 5,537,695 | 7/1996 | Ander | 4/902 |
| 5,685,029 | 11/1997 | Gee | 4/902 |

Primary Examiner—Charles R. Eloshway
Attorney, Agent, or Firm—McDermott, Will & Emery

[57] ABSTRACT

A potty for toilet training has a base with a hollow space, a seat with a big hole in its middle and mounted on the base, and receptacle received in the hollow space. Child's condition detecting circuit detects a first condition when a child sits on the seat and begins to relieve himself or herself, and a second condition when he or she rises from the seat. Responding to a result of the first condition, a trigger signal generating circuit generates a trigger signal and stops generation of the trigger signal in response to a result of the second condition. Responding to the trigger signal, a sound/melody generating circuit informs parents that their child begins to relieve himself or herself, generates a natural sound to entertain him or her during evacuation, informs the parents that their child has risen from the seat after stool in response to the stop of the trigger signal, and generates a congratulatory melody or voice message. An aural sound generating circuit amplifies the sounds and message and converts them into audible sounds through a speaker. The potty can provide motivation for the child to go to stool by himself or herself.

12 Claims, 6 Drawing Sheets

POTTY FOR TOILET TRAINING

TECHNICAL FIELD

The present invention relates to a potty used to toilet train seven-month old infants to six-year old ones (hereinafter, children). More particularly, it relates to a potty for toilet training which generates a natural sound when a child sits thereon and begins to relieve himself or herself and provides him or her with a congratulatory melody or voice message when he or she finishes evacuation and stands up from the toilet to provide motivation for the child to go to stool by himself or herself, thus making the toilet training easier.

BACKGROUND ART

According to Freudianism, babyhood of one- ~ twenty four-month old infants is the important stage for basic formation of character, and most of the two- ~ six-year old infants can relieve themselves in a given place and in the correct body position through several toilet-training and trials and errors. If motivation is provided to children in this babyhood to show their intention to evacuate, they can easily go to stool by themselves. This toilet training helps children with becoming well rounded.

Babyhood is a very important stage of the life of human being because the babyhood is the stage for basic formation of emotion, custom and character. It is preferred to let the infants naturally acquaint themselves with interest with the correct emotion as well as with the correct custom.

A conventional potty includes a push button and a melody generator provided to an animal-shaped head portion. This melody generator of the conventional potty goes into action by pressing the push button regardless of relieving motion of the infants. The conventional potty scarcely lets the infants naturally early accustom themselves to relieve themselves in a given place and in the correct body position.

U.S. Pat. No. 5,535,456 granted to the present inventor discloses a potty for generating a sweet sound, such as sweet melody or sweet voice message stimulating interest of the infants when an infant relieves oneself in a correct body position such that the urine reaches a predetermined position of the potty, thereby letting the infants to naturally accustom themselves early to relieve themselves in a given place and in the correct body position. This potty, however, may stimulate children's interest in the use of the potty, and does not allow the children to relieve themselves at rest. The conventional potty does not let parents know the point of time when they have to remove excreta and clean their child with toilet paper after stool, so the parents pay attention to their children.

In addition, the '456 patent's potty has a first switch provided in a given portion of the seat and operated by pressure caused by the weight of an infant sitting on the seat. Thus, as the infant changes his or her pose, the first switch may be turned off. Since a second switch is provided in a given portion of the bottom of the bowl, it does not go into action until the infant urinates when he or she passes feces, and causes a delay in response and malfunction. Its sound generator simply produces a sound within a predetermined period of time, and does not generate various melodies or voice messages which can help infants with going to stool by themselves.

Dean's U.S. Pat. No. 5,008,964 discloses a child's toilet including a potty chair base with a hole in the middle, a potty chair having a chair seat and a removable waste receptor inserted into the hole of the potty chair base, a pressure sensing switch positioned between the chair seat and potty chair and closed when a child sits on the chair seat, and a moisture sensing circuit detecting the introduction of urine or feces into the waste receptor.

Whenever the switch is closed by the infant sitting on the chair seat, a tune generating circuit produces a musical sound converted from musical sound data that is read out of a data storage circuit to entertain the infant. When a signal is output by evacuating, speech message data from the data storage circuit is converted through a speech generating circuit to be produced as a congratulatory voice.

Therefore, Dean's '964 patent plays a sweet song or melody when an infant sits on the potty chair, and when detecting urine or feces introduced into the waste receptor, it provides him or her with congratulatory sound, which stimulates interest of him or her in the use of the potty, thus making the toilet training for infants easier.

However, since Dean's '964 patent plays a melody automatically whenever an infant sits on the potty chair, using the potty as a toy by the infant causes an unnecessary consumption of dry batteries. In case that it takes time for an infant to relieve himself or herself and all the vocal messages are output, parents do not know the point of time when the infant rises from the potty chair, and have to pay attention to him or her. In addition, when the child rises from the potty chair without relieving himself or herself until a song or vocal message ends, the parents also have to pay attention to their child because the potty does not have any function informing them thereof. An electronic circuitry for performing this function may be complicated and expensive.

SUMMARY OF THE INVENTION

It is an object of the present invention to provide a potty for toilet training which plays a natural sound or sweet melody when an infant sits on the toilet and begins to relieve himself or herself, in order not to bore him or her, and plays a congratulatory melody and/or sound as he or she rises from the toilet after stool to provide motivation to the infant to go to stool by himself or herself and to quickly rise from the toilet, thus making the toilet training for children easier.

It is another object of the present invention to provide a potty for toilet training which gets rid of factors of malfunction and lowers the production costs by using an extremely simple electronic circuitry.

It is another object of the present invention to provide a sensing device which detects children's relieving motion with reliability and is of compact structure.

It is another object of the present invention to provide a potty for toilet training which is reset in a given period of time after it plays a congratulatory melody or message for a child when he or she rises from the potty, thus preventing him or her from sitting on the potty in sport.

It is another object of the present invention to provide a potty for toilet training having a seat that can be mounted on an adult's toilet and used for children, and a base that can be used as footboard by turning it upside down, thus letting children who have toilet trained with this potty naturally use the adult's toilet.

It is still another object of the present invention to provide a potty for toilet training which informs parents that their child begins to relieve himself or herself and rises from the potty after stool so that the parents do not have to pay attention to him or her continuously, and can clean him or her with toilet paper in good time.

In order to achieve the above objects, the present invention provides a potty for toilet training having a base with a hollow space, a seat with a big hole in its middle and mounted on the base, and receptacle received in the hollow space, comprising a child's condition detecting circuit detecting a first condition when a child sits on the seat and begins to relieve himself or herself, and a second condition when he or she rises from the seat; a trigger signal generating circuit generating a trigger signal in response to a result of the first condition from the child's condition detecting circuit, and stopping generation of the trigger signal in response to a result of the second condition; a sound/melody generating circuit informing parents that their child begins to relieve himself or herself in response to the trigger signal, generating a first sound to entertain him or her during evacuation, informing the parents that their child has risen from the seat after stool in response to the stop of the trigger signal, and generating a second sound; and an aural sound generating circuit amplifying the first and second sounds and converting them into audible sounds through a speaker.

According to another aspect of the present invention, a potty for toilet training comprises a base with a hollow space; a seat with a big hole in its middle and detachably mounted on the base; a receptacle having a lower portion received in the hollow space of the base through the seat's hole, and a skirt caught in the hole's rim of the seat: first and second moisture sensing terminals passing through the receptacle's bottom and embedded therein from the above spaced a given distance away from one another, and each brought into an operating state by moisture of urine or feces; a first contact switch provided to the hollow space of the base and having one terminal connected to a power, and coming into contact with the first moisture sensing terminal when a child sits on the seat; a second contact switch provided to the hollow space of the base and coming into contact with the second moisture sensing terminal when a child sits on the seat; a trigger signal generating circuit generating a trigger signal in response to a first condition signal from the second contact switch when the first and second moisture sensing terminals and first and second contact switches are each brought into an operating state, and stopping generation of the trigger signal as the first and second contact switches are each brought into a nonoperating state; a sound/melody generating circuit informing parents that their child begins to relieve himself or herself in response to the trigger signal, generating a natural sound to entertain him or her during evacuation, informing the parents that their child has risen from the seat after stool in response to the stop of the trigger signal, and generating a congratulatory melody; and an aural sound generating circuit amplifying output signals of the sound/melody generating circuit and producing audible sounds through a speaker.

DETAILED DESCRIPTION OF THE INVENTION

A child's toilet of the present invention is now fully described with reference to the accompanying drawings.

Figure 1:
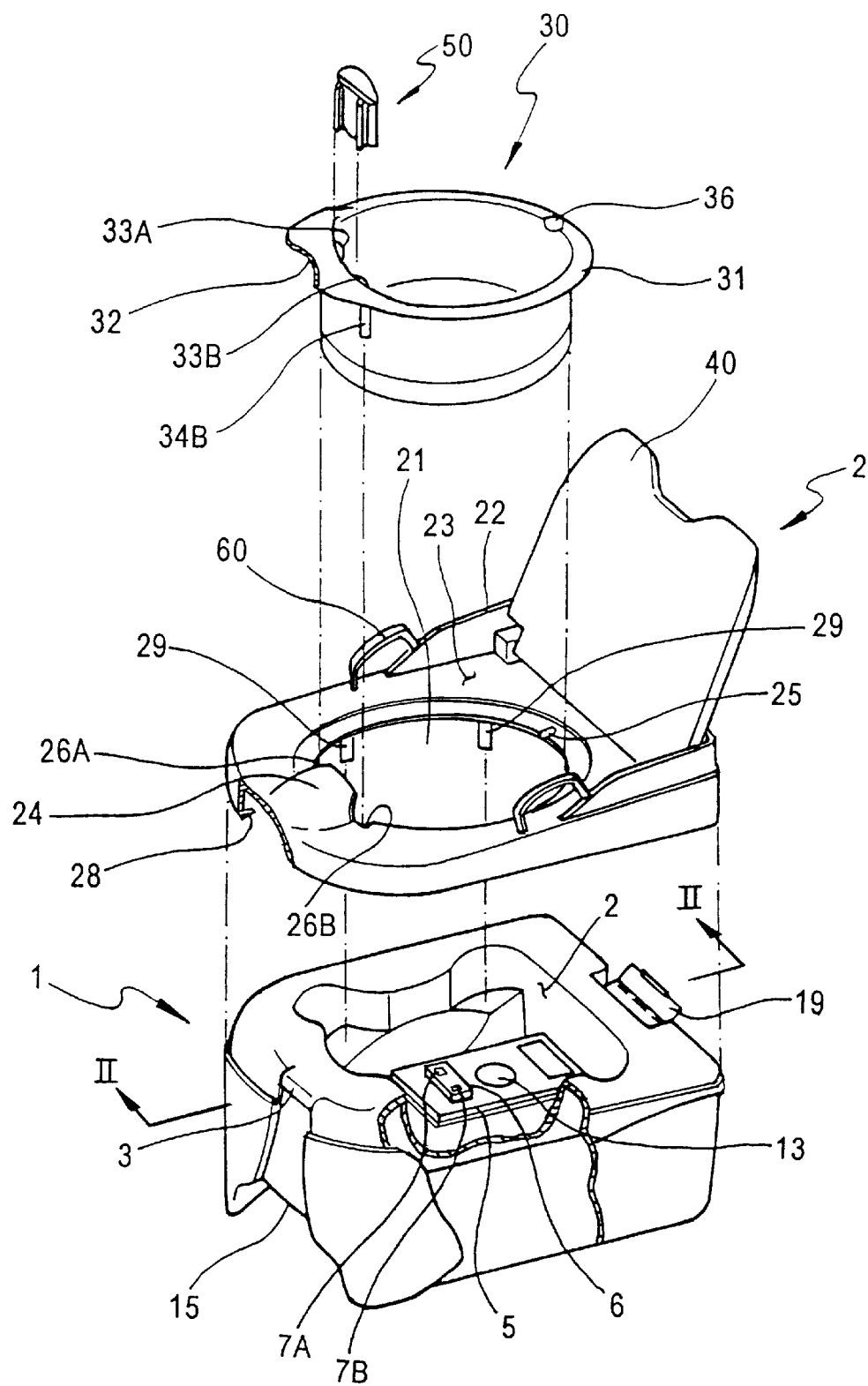
FIG. 1 is an exploded perspective view of a potty for toilet training in accordance with the present invention.
Figure 2:
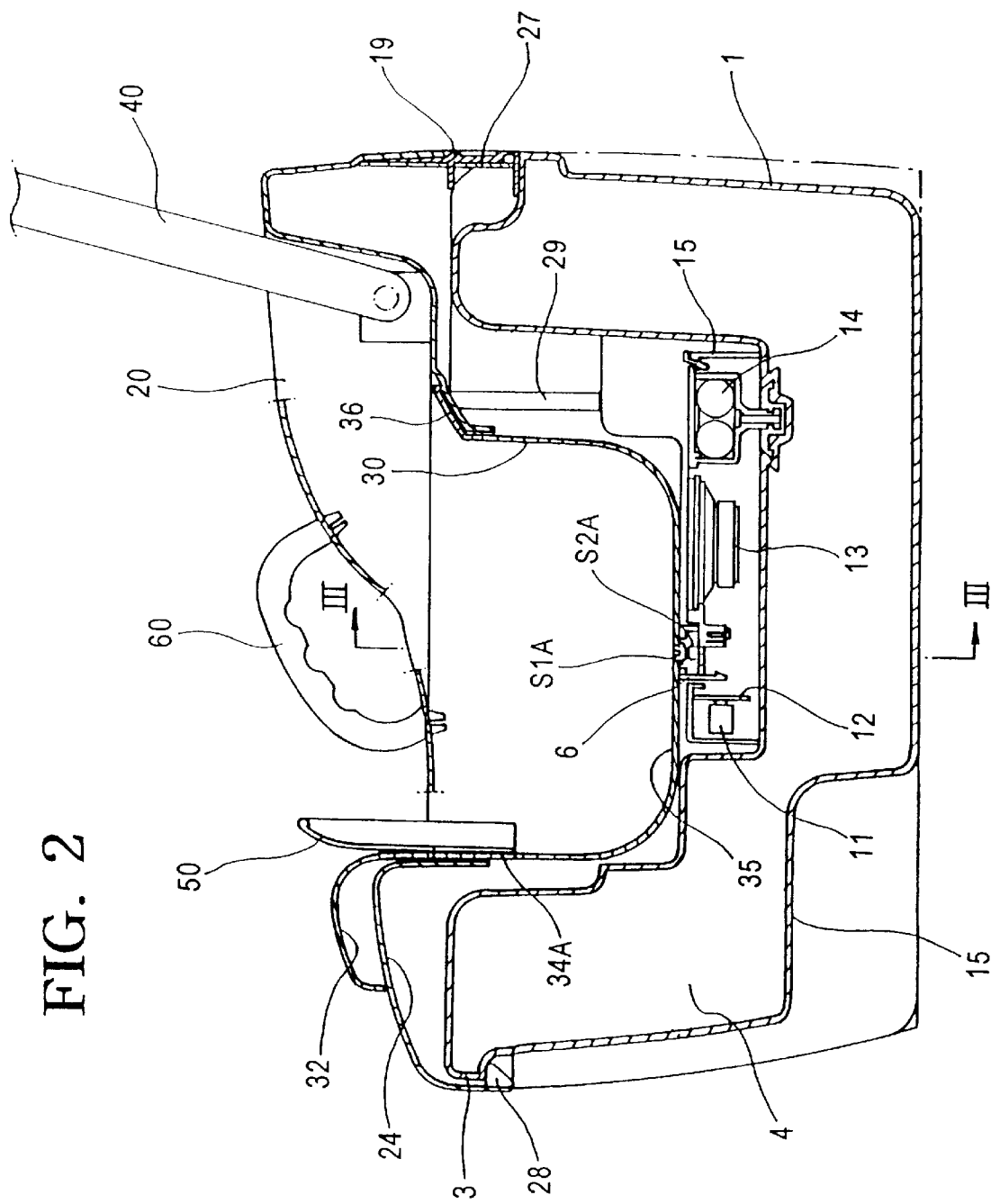
FIG. 2 is a sectional view as taken along line II—II of FIG. 1.
Figure 3:
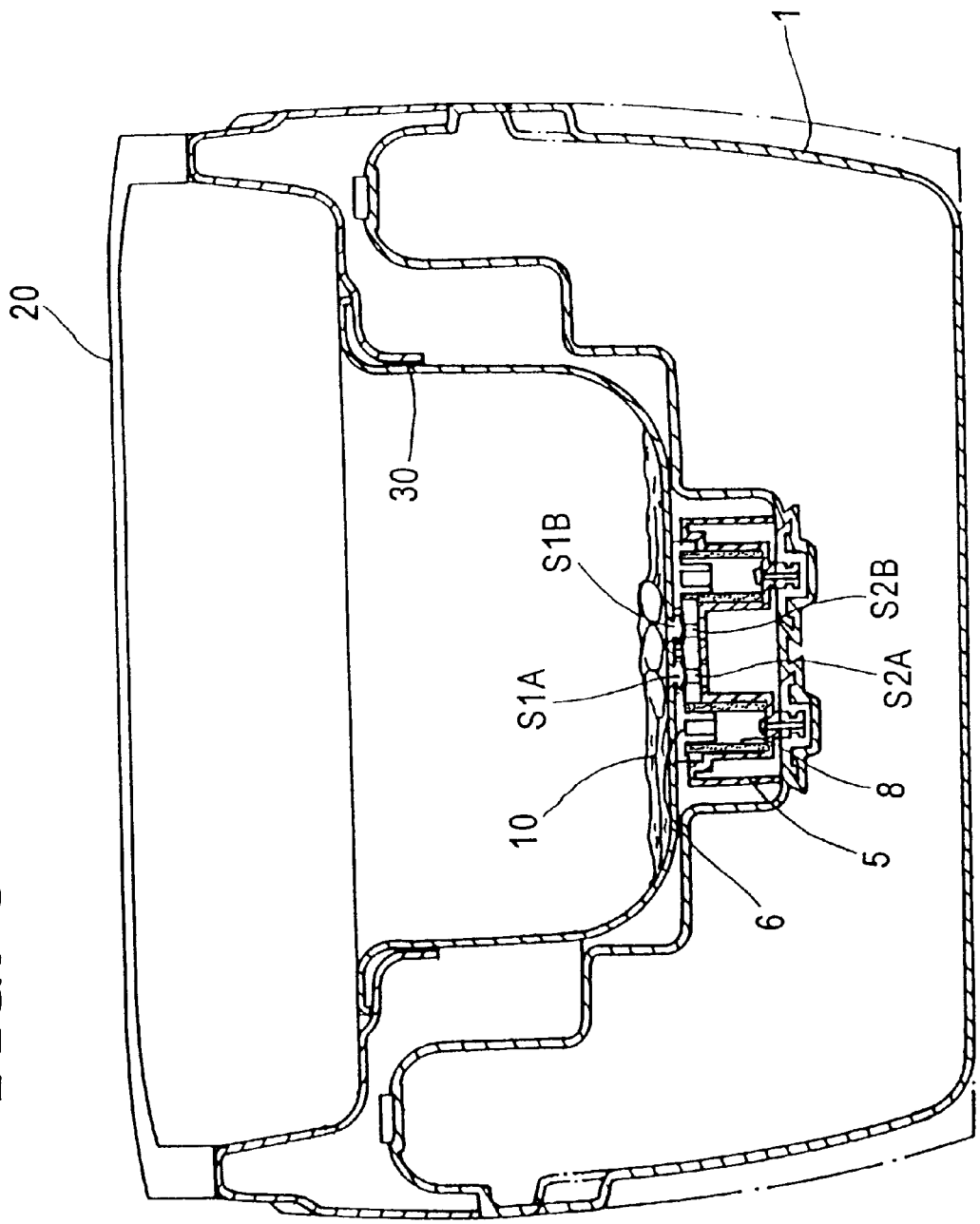
FIG. 3 is a sectional view as taken along line III—III of FIG. 2.

Referring to FIGS. 1 to 3, a child's toilet includes a seat 20 having a big hole 21 in its middle and sidewalls 22 each protruding from its right and left rear sides; and a base 1 having a hollow space 2 and receiving seat 20 in its upper portion. Seat 20 includes a flat upper side 23 formed inside of sidewalls 22, and a chair back 40 hinged and pivoting on the rear end of flat upper side 23. This chair back 40 may be used as a lid of the toilet.

A receptacle 30 having a skirt 31 is removably received in hole 21 of seat 20, and they are coupled to each other at a given position and have an alignment structure to prevent dislocation. Receptacle 30 has a bulging portion at its front skirt 31 and a round groove 32, and a rise 24 is formed at the front of upper side 23 corresponding to groove 32 to be partly received in round groove 32 for this alignment structure. A projection 36 is downwardly formed in receptacle 30's rear skirt 31, and a race 25 is formed at the rear rim of seat 20's hole 21 corresponding to projection 36. A pair of grooves 33A and 33B are provided to an inner surface of the front part of receptacle 30, and a urine blocking piece 50 slidably fits in grooves 33A and 33B from the above. A pair of outward projections 34A and 34B, constituting grooves 33A and 33B, slidably fit in a pair of races 26A and 26B, provided to the front rim of seat 20's hole 21, from the above, thus preventing sway.

A pair of moisture sensing terminals S1A and S1B are embedded in the middle of receptacle 30's bottom 35 to be spaced a given distance away from each other to form an excreta sensor for detecting the introduction of excreta 10. Sensing terminals S1A and S1B each having a hemispherical bottom come in contact with a pair of contact switches S2A and S2B when a child sits on seat 20 and presses skirt 31 of receptacle 30. A pair of rails 27 are provided to the inside of seat 20's rear wall, and one end of a hinge member 19, having the other end connected to upper portion of base 1, is slidably coupled to rails 27 from below. Hinge member 19 is made of synthetic resin, and its slit portion may be curved to connect seat 20 to base 1. A pair of hooks 28 are integrally formed in the interior of seat 20's front part, and a coupling protrusion 3 is formed on the upper portion of base 1's front end to correspond to hooks 28. As seat 20's front end turns about hinge member 19, hooks 28 are elastically snap-fastened to coupling protrusion 3. Four support legs 29 are provided to the bottom of seat 20, extending downward and supported on the bottom of hollow space 2 of base 1. Each support leg 29 has an outward projection.

Figure 6:
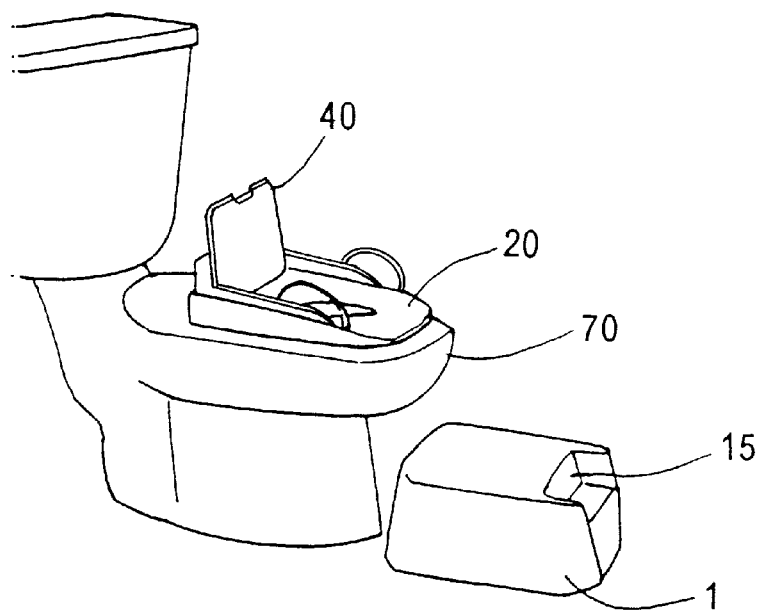
FIG. 6 is a perspective view showing that the inventive potty from which base is removed is installed on an adult's stool in order to induce a child to use the adult's stool.

When seat 20 of the present invention is separated from base 1 after toilet training, as shown in FIG. 6, and mounted on an adult's stool 70, it can be used as a potty with chair back 40. At this point, base 1 may be used as a footboard by turning it upside down. If a groove 15 is provided to the lower portion of base 1's front, a child can use it as steps.

As described above, if seat 20 is used in adult's stool 70 for children, children who have been toilet trained with the inventive toilet may use big-sized adult's stool 70 without offense.

Base 1 has a hollow portion 4, and seat 20 and receptacle 30 are received in hollow space 2. Receptacle 30's bottom comes in contact with an ejecting member 6 elastically ejected from a housing 5, fixed onto hollow space 2, by a spring 8 (FIG. 3). Ejecting member 6 has a pair of contact holes 7A and 7B on its upper portion, and as receptacle 30 is mounted in seat 20, a pair of moisture sensing terminals S1A and S1B come to be on contact holes 7A and 7B. Under contact holes 7A and 7B are a pair of contact switches S2A and S2B, as shown in FIG. 2, and when ejecting member 6 is pushed by receptacle 30, moisture sensing terminals S1A and S1B come in contact with first and second contact switches S2A and S2B, respectively. Moisture sensing terminals S1A and S1B and first and second contact switches S2A and S2B are each made of a conductive material with small resistance.

Inside of housing 5, are electronic components such as an integrated circuit 11 for signal processing, a printed circuit board (PCB) 12, a speaker (SP) 13, a battery (BAT) 14, etc. If a pair of moisture sensing terminals S1A and S1B go into action by urine or feces, and the moisture sensing terminals S1A and S1B each contact first and second contact switches S2A and S2B by a child sitting on the potty, these components operate to provide various melodies, sound and/or voice message.

Figure 4:
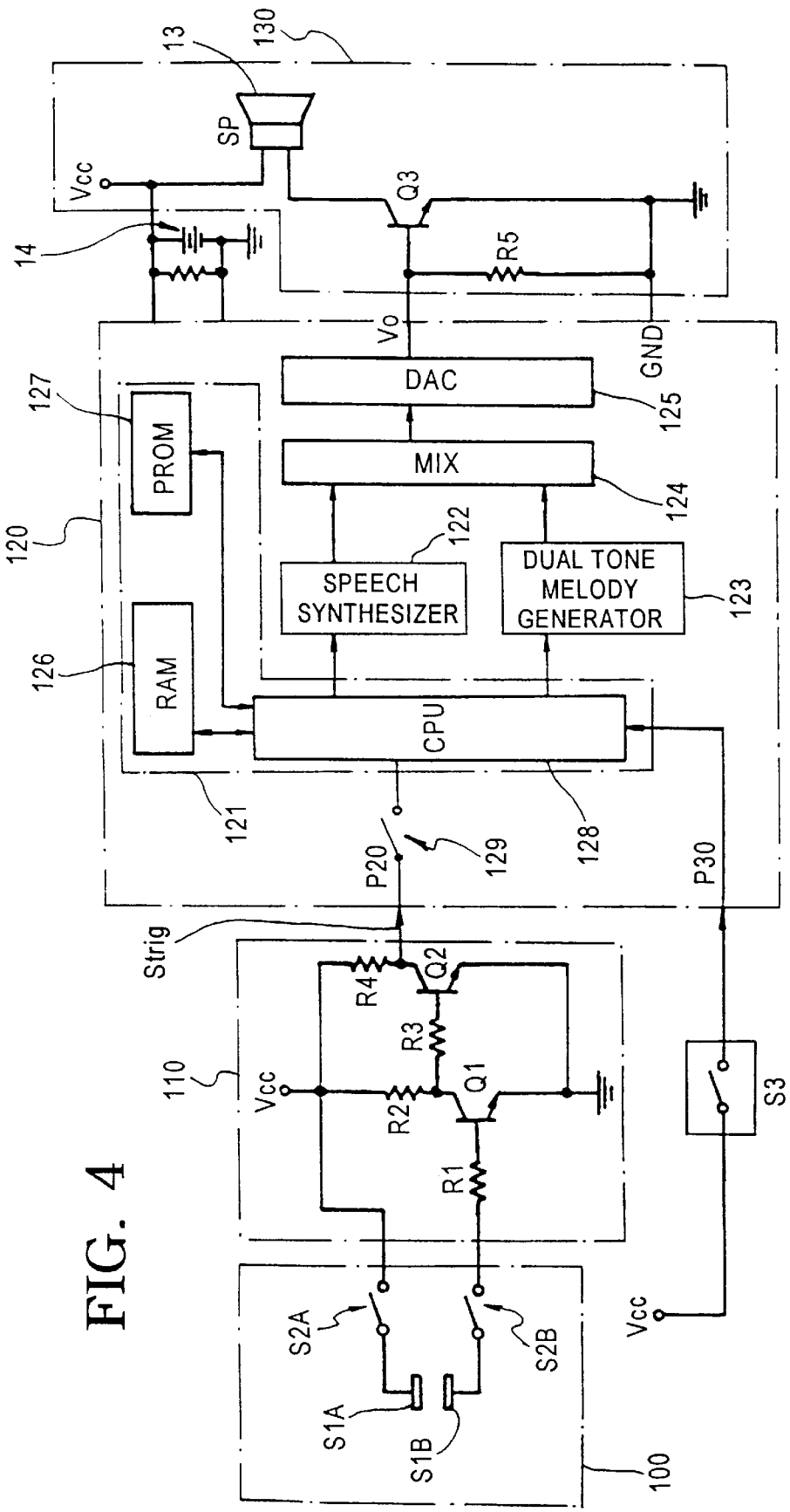
FIG. 4 is an electronic circuit diagram of the potty of FIG. 1.
Figure 5:
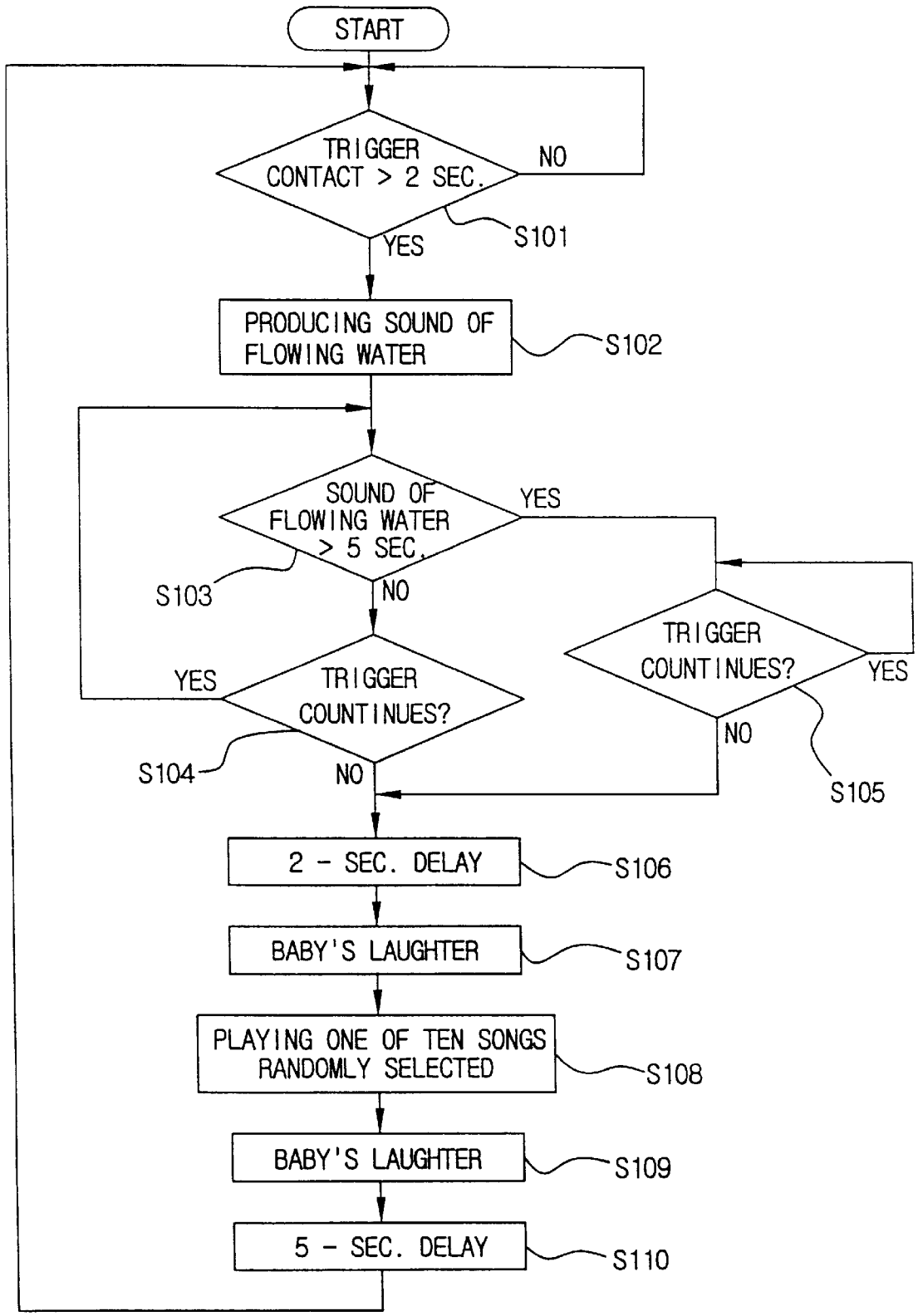
FIG. 5 is a flow chart showing control sequences of a sound/melody generating circuit in accordance with the present invention.

Referring to FIGS. 4 and 5, the electronic circuit system of the inventive potty will now be described.

Referring first to FIG. 4, the inventive system includes four functional circuits, i.e. a child's condition detecting circuit 100 which detects a first condition when a child sits on seat 20 and a second condition when he or she rises from seat 20; a trigger signal generating circuit 110 generating a trigger signal Strig in response to a result of the first condition generated from child's condition detecting circuit 100, and stopping generation of the trigger signal in response to a result of the second condition; a sound/melody generating circuit 120 which informs parents that a child begins to relieve himself or herself in response to the trigger signal Strig, generates a melody or natural sound to entertain him or her during evacuation, informs the parents that the child has risen from seat 20 after stool in response to the stop of trigger signal string, and generates a congratulatory melody and/or voice; and an aural sound generating circuit 130 amplifying an output signal of sound/melody generating circuit 120 through speaker 13.

In child's condition detecting circuit 100, first contact switch S2A is brought into an operating state by receptacle 30 pressed down when a child sits on seat 20 and having one terminal connected to power, and second contact switch S2B is brought into an operating state when a child sits on seat 20. These two switches are respectively connected to moisture sensing terminals S1A and S1B that go into action when the child's urine or feces are put into receptacle 30. A pair of moisture sensing terminals S1A and S1B are each coupled in series between first and second contact switches S2A and S2B.

As described above, a pair of contact switches S2A and S2B are brought into an operating state by receptacle 30 pressed down as a child sits on seat 20, and when he or she begins to relieve himself or herself in receptacle 30, moisture sensing terminals S1A and S1B are each brought into an operating state, too. At this point, child's condition detecting circuit 100's second contact switch S2B produces a high-level first condition signal, and when the child rises from seat 20, contact switches S2A and S2B produce a low-level second condition signal.

In trigger signal generating circuit 110 which includes resistors R–R4 a base resistance R1 to which the first and second condition signals are applied has an other terminal connected to a transistor Q1's base. Transistor Q1 has an emitter grounded. A load resistor R2 is interposed between transistor Q1's collector and power Vcc, thereby producing an inverted output of its input signal from the collector of the transistor Q1. Transistor Q1's output signal is applied to a transistor Q2's base through a base resistor R3. A trigger signal Strig of trigger signal generating circuit 110 is output from a node of transistor Q2's collector and a resistor R4.

In receipt of the high-level first condition signal, trigger signal generating circuit 110 generates the same trigger signal by means of two-stage transistor connection, and also stops generation of a trigger signal Strig in response to the low-level second condition signal.

Sound/melody generating circuit 120 may be constituted by using SN 68003 of single chip voice/dual tone melody synthesizer IC SN68000 series from Sonex Technology Co., Ltd. The SN 68003 voice/dual tone melody synthesizer IC is a chip providing a capacity of three-second vocal message. SN6860 of the SN68000 series provides a capacity of maximum 60-second voice message.

The present invention uses two input ports P20 and P30 of two 4-bit I/0 ports, and its integrated circuit includes a tiny controller CONT 121, a speech synthesizer 122, a dual tone melody generator 123, a speech/dual tone melody mixer MIX 124, and a digital/analog converter DAC 125. A user can program section combination, trigger mode, output condition, logic operation, etc. through tiny controller 121.

Tiny controller 121 includes a central processing unit (CPU) 128, a 256-bit random access memory (RAM) 126 and a maximum 16-Kbit programmable read only memory (PROM) 127, and a user stores a program including necessary data and commands in PROM 127 to operate speech synthesizer 122 and dual tone melody generator 123, thus performing voice synthesis and melody generation. In addition, the user may combine the output sequence of synthesized voice and melody through speech/dual tone melody mixer 124. DAC 125 converts a digital output of mixer 124 into an analog signal and produces it to the outside through output terminal Vo.

In sound/melody generating circuit 120, trigger signal input port P20 includes a timing switch 129, and just in case that external trigger signal Strig is maintained for two seconds, it recognizes this external signal. Timing switch 129 prevents the system from malfunctioning when a child's buttocks move up and down while he or she is relieving himself or herself. Sound/melody generating circuit 120 operates switch S3 to apply a control signal to internal controller 121 through external input port P30 thus making it possible to cut off an output of speech synthesizer 122.

The operation of sound/melody generating circuit 120 employing the SN 68003 voice/dual tone melody synthesizer IC is now described with reference to FIG. 5.

When a child sitting on seat 20 relieves himself or herself in receptacle 30, a pair of moisture sensing terminals S1A and S1B and first and second contact switches S2A and S2B are brought into an operating state, and high-level trigger signal Strig is produced from trigger signal generating circuit 110 to be applied to input port P20 of sound/melody generating circuit 120.

Accordingly, sound/melody generating circuit 120 determines if trigger signal Strig is maintained for two seconds or more (S101), and if not so, it goes to the initial stage and waits for application of trigger signal Strig. When trigger signal Strig is maintained for more than two seconds, speech synthesizer 122 is operated to produce a sound of flowing water such as murmurs of stream to aural sound generating circuit 130's transistor Q3 for signal amplification through output terminal Vo. Accordingly, when transistor Q3 is turned on to drive speaker (SP) 13 provided to its collector, the sound of flowing water radiates therefrom (S102).

This sound of flowing water induces the child to reuse the inventive potty out of curiosity and does not bore him or her. Any kind of natural sounds, melodies or voice messages that can entertain children will do instead of the sound of flowing water. This sound lets parents know that their child begins to relieve himself or herself and prepare themselves for cleaning their child with toilet paper after stool.

Sound/melody generating circuit 120 determines whether or not the sound of flowing water is produced for a given period of time, e.g. five seconds (S103). If not so, it determines whether or not trigger signal Strig is input (S104). If trigger signal Strig is continuously input, it returns to step S103 and generates the sound of flowing water for five seconds. When trigger signal Strig is not input at step S104, i.e. when the child rises from seat 20 after stool and first and second contact switches S2A and S2B are brought into an open state not to produce trigger signal Strig, circuit 120 goes to step (S106) and there is a delay for two seconds.

In the meantime, if five seconds elapse at step S103, it goes to step S105 to monitor whether or not trigger signal Strig is input. When trigger signal Strig is not input, it determines that trigger signal generating circuit 110 does not produce trigger signal Strig, and goes to step S106 and there is a delay for two seconds. This 2-second delay is prepared not to surprise children at the voice/melody sound (to be described later) produced as soon as he or she rises from seat 20.

After the 2-second delay, sound/melody generating circuit 120 operates speech synthesizer 122 to provide the child with baby's laughter familiar to children (S107), and drives dual tone melody generator 123 to play a song randomly selected from ten memorized ones (S108). After the song, it provides the baby's laughter to the child for about 1.5 seconds.

In the above steps S107 to S109, the baby's laughter and musical melodies may be rearranged in order from necessity. In addition, a congratulatory message such as "Good for you! Come and see me again!", "What a good kid! Congratulation for relieving oneself!", etc. may be stored in another chip of SN68000 series with a large capacity of voice message, e.g. SN68060 and provided to a child who rises from seat 20 after stool by the use of its sufficient voice message capacity of 60 seconds, instead of the baby's laughter.

If the chip is of large voice message capacity, the sound provided at step S102 may be replaced with a congratulatory voice message such as "Welcome! You've already started to relieve yourself!". Parents do not have to pay attention to their child when he or she is relieving himself or herself and may quickly clean their child with toilet paper after stool by automatically providing such voice message and melody when he or she rises from seat 20. In addition, providing the voice message and melody leads the child to rise from the potty quickly after stool and stops him or her from sitting on the potty unnecessarily, thus saving battery and allowing the parents to do another housework without taking care of their child.

Sound/melody generating circuit 120 is reset after a five-second delay from a time when the child has risen from seat 20 at step S110, and returns to step S101, which prevents battery consumption by the child's sitting on and rising from seat 20 in order to listen to the above sound and melody.

The inventive potty's housing is stable in structure, and includes chair back 40 and handles 60 to allow an infant to be sitting on the potty with safety. Base 1, seat 20 and receptacle 30 are fit together and detachable from one another with ease, and the inventive potty —may be used as a toy car, a child's chair, etc.

In addition, moisture sensing terminals S1A and S1B and contact switch that are each compact, reliably detect a child's relieving condition by mutual contact, and there is no need to employ any electronic circuit for connecting them or monitoring the condition of each component, thus simplifying the circuit design. In addition, the present invention does not require various electronic components for the overall circuit design, thus reducing factors of malfunction and lowering the production costs.

As described above, the potty of the present invention provides children relieving themselves thereon with a natural sound such as the sound of flowing water to relieve their stress and entertain them, and plays a congratulatory song or voice message to induce them to go to stool by themselves and quickly rise from the potty after stool, thus facilitating and quickening the toilet training.

The present invention employs reliable and compact sensing devices and voice/dual tone synthesizer integrated circuits, thereby simplifying the circuit design and reducing factors of malfunction. The potty chair base of the present invention may be used as a footboard by turning it upside down, and its seat can be mounted on an adult's toilet and used on it for children who have been toilet trained with the inventive potty, without offense.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A potty for toilet training having a base with a hollow space, a seat with a big hole in its middle and mounted on the base, and receptacle received in the hollow space, the potty comprising:

child's condition detecting means for detecting a first condition when a child sits on the seat and relieves himself or herself into the receptacle, and a second condition when he or she rises from the seat;

trigger signal generating means for generating a trigger signal in response to detection of the first condition from the child's condition detecting means, and stopping generation of the trigger signal in response to detection of the second condition;

sound/melody generating means for generating a first sound signal in response to the trigger signal to entertain the child during evacuation and inform the parents that their child is relieving himself or herself, and generating a second sound signal in response to the stopping of the generation of the trigger signal to congratulate completion of stool and inform the parents that their child has risen from the seat after stool; and aural sound generating means for amplifying the first and second sound signals and converting them into audible sounds through a speaker.

2. A potty for toilet training according to claim 1, wherein the child's condition detecting means includes:

first and second moisture sensing terminals passing through the receptacle's bottom and embedded therein and spaced a given distance away from one another, and each brought into an operating state by contact with moisture of urine or feces;

a first contact switch provided in the hollow space of the base and having an one terminal connected to a power, and coming into contact with the first moisture sensing terminal when the child sits on the seat; and a second contact switch provided in the hollow space of the base and coming into contact with the second moisture sensing terminal when the child sits on the seat, and producing the first condition signal from a second terminal when the child sitting on the seat begins to relieve himself or herself and the second condition signal when he or she rises from the seat.

3. A potty for toilet training according to claim 2, further comprising an ejecting member having an elastic force acting upward and a pair of contact holes corresponding to upper portions of the first and second contact switches to stop the lower portion of the first and second moisture sensing terminals from each contacting the first and second contact switches when nobody sits on the seat.

4. A potty for toilet training according to claim 3, further comprising automatic alignment means positioned on a skirt located on the receptacle and on the perimeter of the seat's hole for aligning the lower portions of the first and second moisture sensing terminals in relation to the contact holes of the ejecting member and for preventing the receptacle from swaying.

5. A potty for toilet training according to claim 1, wherein the child's condition detecting means includes:

first and second moisture sensing terminals passing through the receptacle's bottom and embedded therein and spaced a given distance away from one another, and each brought into an operating state by moisture of urine or feces; and first and second contact switches connected in series with the first and second moisture sensing terminals, brought into an operating state when a child sits on the seat, and brought into a nonoperating state when he or she rises from the seat.

6. A potty for toilet training according to claim 1, wherein the sound/melody generating means includes:

data storage means for storing a plurality of melody data and at least one voice message data;

a dual tone melody generator for generating a melody upon application of the melody data;

a speech synthesizer for synthesizing a voice message upon application of the voice message data;

a mixer for combining an output sequence of the melody data and the voice message data;

a digital/analog converter for converting a digital signal from the mixer into an analog signal; and signal processing means for applying at least one of a plurality of the melody data and voice message data to the dual tone melody generator or the speech synthesizer upon application of the trigger signal, thus generating the first sound, and applying one of the various melody data and voice message data if the trigger signal is cut off, thus generating the second sound.

7. A potty for toilet training according to claim 6, wherein the sound/melody generating means generates the second sound for a predetermined period of time, and is reset after delay of a given time.

8. A potty for toilet training according to claim 6, further comprising a timing switch for holding application of the trigger signal for a given period of time.

9. A potty for toilet training according to claim 1, further comprising a back for supporting a child's back when it is pivotally set on end at the seat's rear, and used as a lid covering the hole of the seat.

10. A potty for toilet training according to claim 1, further comprising hinge coupling means for connecting the seat's rear end to the base's lower end, and snap fastening means for holding the seat's front end and the base's upper end together.

11. A potty for toilet training according to claim 1, further comprising four legs each provided in four sides of the seat's bottom.

12. A potty for toilet training comprising:

a base with a hollow space;

a seat with a big hole in its middle and detachably mounted on the base;

a receptacle having a lower portion received in the hollow space of the base through the seat's hole, and including a skirt held by the rim of the hole in the seat:

first and second moisture sensing terminals passing through the receptacle's bottom and embedded therein and spaced a given distance away from one another, and each brought into an operating state by contact with moisture of urine or feces;

a first contact switch provided in the hollow space of the base and having one terminal connected to a power source, and coming into contact with the first moisture sensing terminal when a child sits on the seat;

a second contact switch provided in the hollow space of the base and coming into contact with the second moisture sensing terminal when a child sits on the seat;

trigger signal generating means for generating a trigger signal in response to a first condition signal from the second contact switch when the first and second moisture sensing terminals and first and second contact switches are brought into contact, and stopping generation of the trigger signal when the first and second contact switches are subsequently brought out of contact;

sound/melody generating means for generating a natural sound in response to the trigger signal to entertain the child during evacuation and inform the parents that their child is relieving himself or herself, and generating a congratulatory melody in response to the stopping of the generation of the trigger signal to congratulate completion of stool and inform the parents that their child has risen from the seat after stool; and aural sound generating means for amplifying output signals of the sound/melody generating means and producing audible sounds through a speaker.

* * * * *